United States Patent [19]

Dolby et al.

[11] 3,838,352

[45] Sept. 24, 1974

[54] LINE OUTPUT CIRCUITS

[75] Inventors: Ray Milton Dolby; Bjorn Erik Edvardsen, both of London, England

[73] Assignee: Dolby Laboratories, Inc., New York, N.Y.

[22] Filed: June 25, 1973

[21] Appl. No.: 373,165

[30] Foreign Application Priority Data

June 29, 1972 Great Britain .................... 30541/72

[52] U.S. Cl. .................... 330/105, 179/1 P, 330/26, 330/112, 330/149

[51] Int. Cl. .............................................. H03f 1/26

[58] Field of Search ............. 330/26, 105, 108, 112, 330/149; 179/1 A, 1 F, 1 P

[56] References Cited

UNITED STATES PATENTS

| | | | |
|---|---|---|---|
| 2,905,761 | 9/1959 | Wilkins | 179/1 F |
| 2,960,660 | 11/1960 | Boxall | 330/26 X |
| 3,100,282 | 8/1963 | Fletcher | 330/105 X |
| 3,448,400 | 6/1969 | Breuer | 330/28 X |
| 3,525,812 | 8/1970 | Verdier | 330/105 X |

*Primary Examiner*—Herman Karl Saalbach
*Assistant Examiner*—James B. Mullins
*Attorney, Agent, or Firm*—Dike, Bronstein, Roberts, Cushman & Pfund

[57] ABSTRACT

A line, noise-cancelling output circuit is created without the use of a transformer by detecting the error voltage between the voltages at the input and output ends of the line driven from the circuit. The error voltage is applied to the line output circuit amplifier to establish a positive feedback loop of gain equal to a slightly greater than unity. The error voltage can be derived across a resistor connected between the earthy output terminal of the line output circuit and ground.

12 Claims, 2 Drawing Figures

LINE OUTPUT CIRCUITS

This invention relates to a circuit for providing an output to a two-wire line and which can replace a conventional line output stage utilising a transformer. The invention has particular utility in sound studio equipment whose interconnection presents a problem in the avoidance of the creation of hum loops in particular and of the introduction of noise in general. For this reason it is recognised that at least one end of each line must be balanced, and it is customary to provide much good quality equipment with balanced input stages and balanced output stages to ensure complete freedom of interconnection with other equipment. It has been found that the output circuit the line itself, and the following input circuit should preferably be completely disconnected from ground — i.e. they sould be "floating".

Transformer balanced or floating inputs and outputs are very expensive and contribute greatly to the weight, bulk and chassis coasts of equipment, especially multichannel equipment. It is known in the art to replace transformer balanced input stages by differential amplifier input stages. The art also includes circuits for reducing hum loops in video signal installations; such circuits usually require the use of transformers. A circuit which avoids the use of a transformer is described in British Patent 1,261,950. A compensating current is derived and fed directly into the coaxial line following the line amplifier. This method is, however, useful only where lines are used having a certain characteristic impedance, such as 75 ohms. Also, the method requires adjustment in each use situation.

With audio signals an unbalanced line amplifier usually has a low output impedance (e.g. an ohm or less). The line resistance will typically be of the order of an ohm, and the load resistance will usually be either 600 ohms or 10 K. The method of the above mentioned art is not suitable for these conditions. It is an object of this invention to provide for these conditions in a line output circuit which does not require a transformer but which effectively provides an output which is substantially free from hum loops and other line noises in the event that the load is unbalanced. The circuit is convenient in use and in a wide variety of professional audio conditions does not require adjustment to match the line characteristics (e.g. line resistance and whether the load is balanced or unbalanced). The circuit is primarily directed towards professional audio, but it also has applicability in consumer audio, as well as in video and instrumentation applications.

It will be convenient in describing any pair of terminals to refer to the earthy and non-earthy terminals, the earthy terminal normally being tied to earth or ground (the latter term being employed below).

According to the present invention there is provided a line output circuit including a line amplifier and having a pair of input terminals and a pair of output terminals, the non-earthy input terminal being coupled to one input of a combining circuit whose output is connected to the non-earthy input terminal of the line amplifier, the non-earthy output terminal of the amplifier being coupled to the non-earthy output terminal of the circuit, and the other output terminal of the circuit being coupled to a second input of the combining circuit to establish a positive loop of substantially unity gain from the said other output terminal of the circuit to the non-earthy output terminal of the circuit.

Further, according to the invention, there is provided an audio amplifier, mixer, noise reduction unit or other audio unit incorporating such a circuit as the output stage thereof. The way in which the invention operates and various practical factors which should be dealt with in the circuit design will be described with reference to the accompanying drawings, in which.

Figure 1:
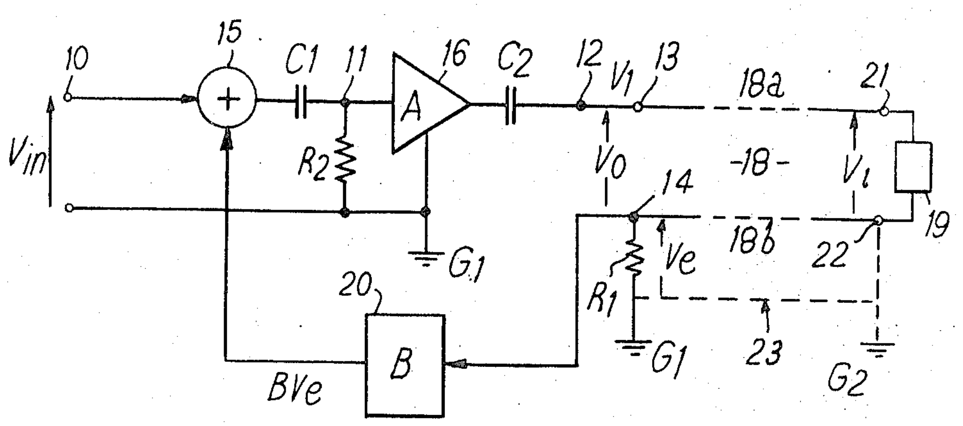
FIG. 1 is a diagram illustrating the basic circuit.

In FIG. 1 the various terminals are identified as follows:

10 = non-earthy circuit input.
11 = non-earthy amplifier input.
12 = non-earthy amplifier output.
13 = non-earthy circuit output.
14 = earthy circuit output.

The earthy circuit input terminal and the earthy amplifier terminal which is common to amplifier input and output are unreferenced and are all connected to ground $G_1$. The combining circuit and amplifier are referenced 15 and 16 respectively, the latter having gain A. Terminal 14 is not connected directly to ground but rather through a medium value resistor $R_1$, that is to say, a resistor large compared with the impedance (usually resistance) of the line 18 at the interference frequencies, but small compared with the lowest anticipated terminating impedance 19 for the line, across which is developed a voltage $V_L$. The former condition ensures that the potential $V_e$ developed across $R_1$ accurately represents the difference between ground potential existing at the two ends of the line ($G_1$ and $G_2$). The latter condition avoids undue waste of the available output volts from the amplifier in the event that the load is balanced, (i.e. not connected to earth). A balanced load may comprise a transformer having its primary winding connected between the two terminals 21 and 22 at the end of the line 18 and having a load connected across its secondary winding. In this case, the terminal 22 is not connected to ground $G_2$. The return current from the load then flows back through the earthy side 18*b* of the line 18 and through $R_1$. Even though there is a voltage drop across $R_1$, the action of the circuit is such as to eliminate the impedance $R_1$ from the load circuit; thus, the output impedance (between 13 and 14) can be maintained at a low value if desired. In audio applications a good value for $R_1$ is 100 ohms, assuming a line resistance less than 1 ohm and a terminating impedance 19 not less than 600 ohms. If the load is unbalanced (with terminal 22 connected to $G_2$), then most of the return current for the load will flow through the ground circuit 23. In this case the earthy side of the line will supply back to the amplifier (at terminal 14) the voltage existing at $G_2$. If the voltage at $G_2$ is different from that of $G_1$, an error voltage $V_e$ is obtained across $R_1$. In video or instrumentation applications, as well as consumer audio applications, the earthy side of the line is usually a screen, which has quite a low resistance, and an appropriate value for $R_1$ is thus about 10 ohms.

The error voltage $V_e$ is fed to the combining circuit 15 through a circuit 20 of gain B; this gain will normally be less than unity. Capacitor $C_1$ and resistor $R_2$ represent the input coupling time constant of the line amplifier 16, and $C_2$ is the output coupling capacitor. The amplifier has a gain A when terminated by the load.

Using the designated voltages it can be seen that $V_o = V_1 - V_e$

Furthermore $V_1 = A(V_{in} + BV_e)$

Therefore $V_o = AV_{in} + ABV_e - V_e$

If $AB = 1$ this reduces to $V_o = AV_{in}$, independent of any error voltage $V_e$ created by earth voltage differences.

The equations given above apply only if the net phase change from terminal 14 round the loop to terminal 13 is zero. The input coupling gives a transfer function $f(s) = (sR_2C_1)/(1 + sR_2C_1)$, and this must be cancelled out by a phase compensation circuit somewhere between 14 and 13 having a transfer function $1/f(s)$, namely an integration characteristic. It should be noted that a correction for phase shifts at high frequencies should preferably also be included in order to minimise high frequency noise such as clicks and pops.

Figure 2:
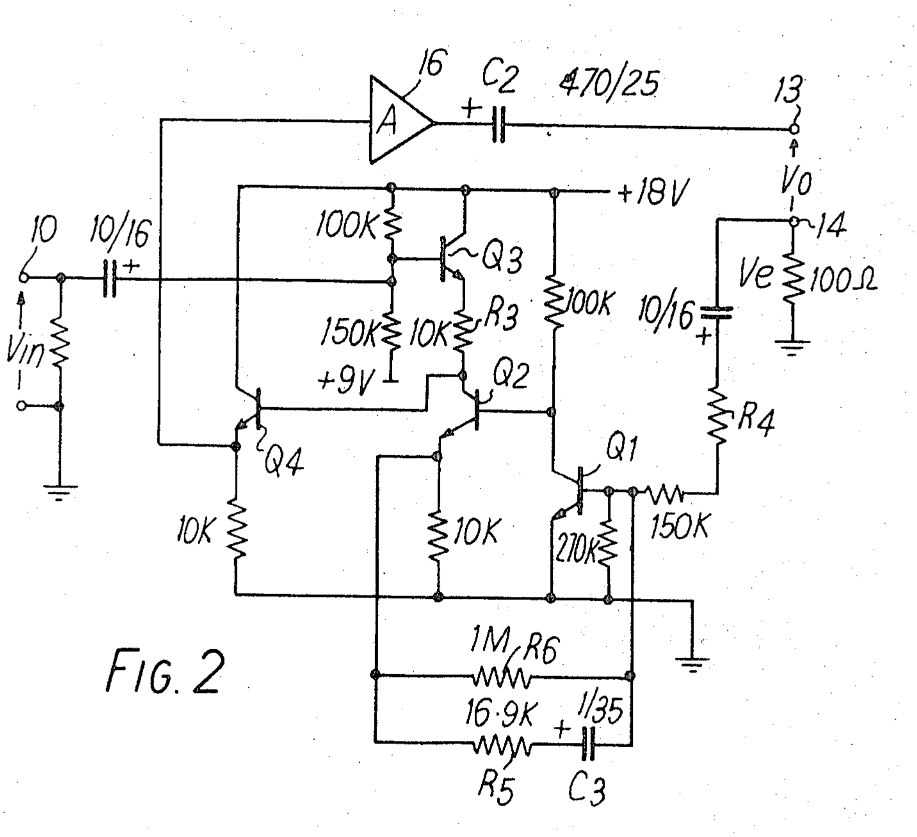
FIG. 2 is a circuit diagram of one embodiment.

One practical circuit is shown in FIG. 2 in which the coupling circuit 15 is formed by transistors $Q_1$ and $Q_2$ with the load resistor $R_3$ of $Q_2$ into which $Q_3$ feeds a current determined by the input signal $V_{in}$. $Q_1$ and $Q_2$ also act as the circuit 20 and the gain B is adjusted by suitably selecting $R_4$ to maximise the cancellation of $V_e$ in the output voltage $V_o$. An integrating, phase compensation network $C_3$, $R_5$, $R_6$ is connected between the base of $Q_1$ and the emitter of $Q_2$. $Q_4$ is an emitter follower buffering the input to amplifier 16. Amplifier 16 has a low output impedance and it is an advantage of the invention that, provided an amplifier with a low output impedance is used, the noise cancellation properties of the circuit are independent of the value of $R_L$. This is of importance in view of the current practice of using low output impedance line amplifiers instead of, as in the aforementioned specification, using matched impedances.

The combining circuit of FIG. 2 is relatively complex since it provides for no loss of signal through the combining means 15. Using resistors and especially with operational amplifiers the combining can be done very simply at the amplifier input. Basically, if the amplifier 16 is non-inverting, then an adder comprising two resistors suffices, one being connected to the signal input 10 and the other being connected to the error voltage terminal 14.

In practical use in professional audio, the circuit of FIG. 2 has the following characteristics. The loop gain is factory adjusted for a gain of about 1 percent greater than unity by adjustment on test of the resistor $R_4$. The extra gain compensates for the attenuation of the true error voltage by the earth return line resistance and the 100 ohm resistor. The earth return line resistance is assumed to be about 1 ohm, which corresponds to about 10 yards of typical good quality two-conductor screened cable. The hum loop rejection is typically 50–60 dB under these conditions. With a cable length of 0 - 20 yards, corresponding to a resistance of 0–2 ohms, a rejection of 40 dB will be obtained at the two extremes. The vast majority of studio installations are thus accommodated without any adjustment of the circuit being required during installation or use.

What is claimed is:

1. A hum loop cancelling output circuit having a pair of non-earthy and earthy input terminals, and a pair of non-earthy and earthy output terminals and including a line amplifier having a pair of non-earthy and earthy input terminals and a pair of non-earthy and earthy output terminals, a combining means having two inputs and an output connected to the non-earthy input terminal of the line amplifier, the non-earthy input terminal of the circuit being coupled to one input of the combining means, the non-earthy output terminal of the amplifier being coupled to the non-earthy output terminal of the circuit, and the earthy output terminal of the circuit and any hum loop voltages from the earthy side of the line being coupled to the second input of the combining means to establish a positive loop of substantially unity gain from the earthy output terminal of the circuit to the non-earthy output terminal of the circuit.

2. A line output circuit according to claim 1, wherein the earthy output terminal of the circuit is connected to ground through a resistor.

3. A line output circuit according to claim 2, for use with audio equipment, wherein the said resistor has a value of the order of 100 ohms.

4. A line output circuit according to claim 2, for use with video equipment, wherein the said resistor has a value of the order of 10 ohms.

5. A line output circuit according to claim 1, further comprising a phase compensation circuit in the positive loop between the two output terminals, such as to render the net phase change around the loop at least at low frequencies substantially zero.

6. A line output circuit according to claim 5, wherein the phase compensation circuit also renders the net phase change substantially zero at high frequencies within the operating band of the circuit.

7. A line output circuit according to claim 1, wherein the gain of the positive loop is slightly greater than unity.

8. In an audio unit having a hum loop cancelling line output circuit including a line amplifier having a pair of non-earthy and earthy input teminals and a pair of non-earthy and earthy output terminals, a pair of non-earthy and earthy unit input terminals and a pair of non-earthy and earthy unit output terminals, the improvement comprising a combining means having two inputs and an output connected to the non-earthy input terminal of the line amplifier, the non-earthy unit input terminal being coupled to one input of the combining means, the non-earthy output terminal of the amplifier being coupled to the non-earthy unit output terminal, and the earthy unit output terminal and any hum loop voltages from the earthy side of the line being coupled to the second input of the combining means to establish a positive loop of substantially unity gain from the earthy unit output terminal of the circuit to the non-earthy unit output terminal.

9. A method of providing a hum loop cancelling line output circuit which includes a line output amplifier and feeds a load through an output line, including the steps of comparing the earth voltage at the load end of the line with the earth voltage at the input end of the line to derive an error voltage, and applying the error voltage to the input of the amplifier in such a manner as to establish a positive feedback loop of substantially unity gain.

10. A method according to claim 9, and further including the step of developing the error voltage across a resistor connected between ground and the earthy line terminal at the input end of the line.

11. A method according to claim 9, and further including the step of compensating for the lowering effect of the earth return line resistance upon the error voltage by making the gain of the positive feedback loop slightly greater than unity.

12. A method according to claim 10, and further including the step of compensating for the lowering effect of the earth return line resistance and of the resistor upon the error voltage by making the gain of the positive feedback loop slightly greater than unity.

* * * * *